Feb. 9, 1937.  J. W. CHILES  2,070,509
COVERING DEVICE FOR PLANTERS
Filed April 1, 1936
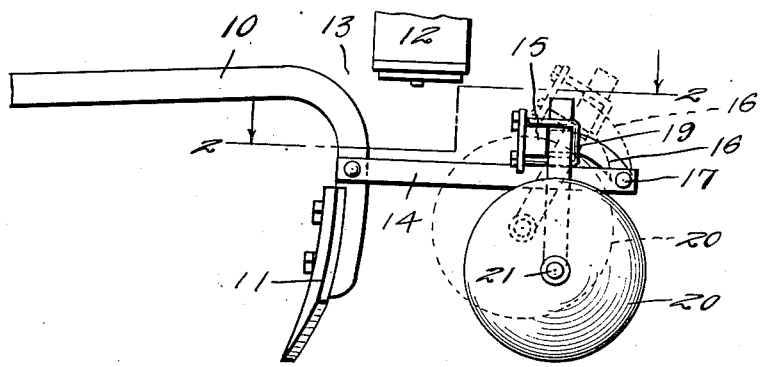
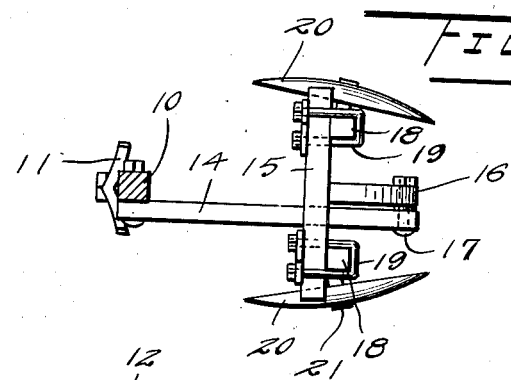
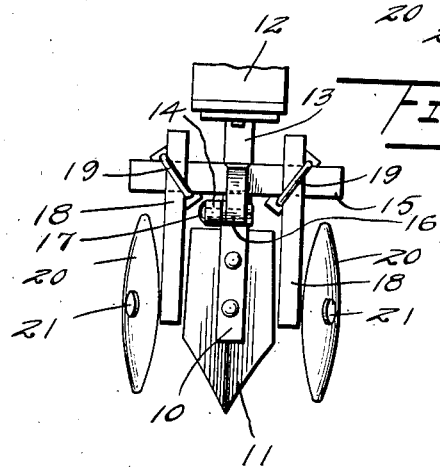
Inventor
J. W. Chiles Patented Feb. 9, 1937

2,070,509

UNITED STATES PATENT OFFICE 2,070,509

COVERING DEVICE FOR PLANTERS

James W. Chiles, El Reno, Okla.

Application April 1, 1936, Serial No. 72,201

4 Claims. (Cl. 97—218)

This invention relates to a covering device for planters and it aims to provide a construction wherein the covering device will penetrate the soil when the planter is tilted as in following uneven ground, as across ditches and streams.

It is particularly aimed to provide a structure wherein the covering device will yield or move upwardly and forwardly in the event it encounters an obstruction or the planter follows uneven ground as in crossing a ditch or a stream.

The more specific objects and advantages will become apparent from a consideration of the description following taken in connection with accompanying drawing, illustrating an operative embodiment.

In said drawing:—

Figure 1 is a view in side elevation of a planter equipped with my improvement;

Figure 2 is a horizontal sectional view taken on the line 2—2 of Figure 1; and

Figure 3 is a rear view of the device of Figure 1.

Referring specifically to the drawing wherein like reference characters designate like or similar parts, a planter is fragmentarily shown having a draft beam 10 provided with a plow 11 to provide the furrow in which seed are dropped by a conventional seed box 12 supported as at 13 on the frame of the planter.

Extending rigidly rearwardly and horizontally from the beam end is a bar 14. Disposed across and normally resting on the bar 14 is a crossbar 15, which has a central rearwardly and downwardly extending arm 16 bolted or otherwise pivotally connected at 17 to the rear end of the bar 14.

Disposed perpendicularly against the cross-bar 15 are standards 18, adjustably secured thereto as by means of U-bolts 19. At the lower end of the standards, concave covering discs 20 are rotatably mounted on axles 21 carried by said standards. Such covering discs are closer together at the rear than at the front, preferably, as shown in Figure 2.

In the operation of the device, as it is drawn along, plow 11 opens the furrow in which seed are dropped from the can or the like 12, following which the furrow is closed or covered by the action of the disc 20. Should the disc 20 strike an obstruction or the apparatus be drawn over uneven ground, as in crossing a ditch or a stream, the disc 20 will not penetrate into the ground but will automatically yield or rise in an upward and forward direction as suggested by the dotted line in Figure 1, the beam 10 usually moving upwardly at the forward end, the bar 14 moving downwardly at the rear end.

Various changes may be resorted to provided they fall within the spirit and scope of the invention.

I claim as my invention:—

1. A combination with a planter having means to provide a furrow, means in the rear thereof to cover the furrow, a mounting device for said means, and means to connect said mounting device to the planter for free upward and forward pivotal movement thereof when in contact with an obstruction.

2. In combination with a planter having means to provide a furrow, a bar extending rearwardly from the planter, a cross-bar pivotally connected to the first-mentioned bar and normally resting thereon, and means to cover the furrow made by the second-mentioned bar.

3. In combination with a planter having means to provide a furrow, a bar extending rearwardly from the planter, cross-bar normally resting on the first mentioned bar and pivotally connected thereto, and furrow-covering disc carried by the second-mentioned bar.

4. In combination with a planter having means to provide a furrow, a bar extending rearwardly from the planter, cross-bar normally resting on the first mentioned bar and pivotally connected thereto, and furrow-covering disc carried by the second-mentioned bar, and standards directly carrying said discs and attached to said second-mentioned bar.

JAMES W. CHILES.